(12) United States Patent
Deever

(10) Patent No.: US 8,446,490 B2
(45) Date of Patent: May 21, 2013

(54) VIDEO CAPTURE SYSTEM PRODUCING A VIDEO SUMMARY

(75) Inventor: Aaron T. Deever, Pittsford, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 246 days.

(21) Appl. No.: 12/786,501

(22) Filed: May 25, 2010

(65) Prior Publication Data

US 2011/0292245 A1 Dec. 1, 2011

(51) Int. Cl.
*H04N 5/76* (2006.01)
*H04N 5/95* (2006.01)
*H04N 11/04* (2006.01)

(52) U.S. Cl.
USPC .............. 348/231.2; 386/95; 375/240.01

(58) Field of Classification Search
USPC .............. 348/231.2; 386/290, 95; 375/240.25
See application file for complete search history.

(56) References Cited

U.S. PATENT DOCUMENTS

| | | |
|---|---|---|
| 3,971,065 A | 7/1976 | Bayer |
| 4,642,678 A | 2/1987 | Cok |
| 4,774,574 A | 9/1988 | Daly et al. |
| 5,189,511 A | 2/1993 | Parulski et al. |
| 5,493,335 A | 2/1996 | Parulski et al. |
| 5,652,621 A | 7/1997 | Adams, Jr. et al. |
| 5,668,597 A | 9/1997 | Parulski et al. |
| 5,818,439 A | 10/1998 | Nagasaka et al. |
| 5,995,095 A | 11/1999 | Ratakonda |
| 6,192,162 B1 | 2/2001 | Hamilton, Jr. et al. |
| 6,292,218 B1 | 9/2001 | Parulski et al. |
| 6,462,754 B1 | 10/2002 | Chakraborty et al. |
| 6,833,865 B1 | 12/2004 | Fuller et al. |
| 6,934,056 B2 | 8/2005 | Gindele et al. |
| 6,956,573 B1 * | 10/2005 | Bergen et al. ................. 345/473 |
| 7,035,435 B2 | 4/2006 | Li et al. |
| 7,046,731 B2 | 5/2006 | Wu et al. |
| 7,055,168 B1 | 5/2006 | Errico et al. |
| 7,403,224 B2 | 7/2008 | Fuller et al. |

(Continued)

FOREIGN PATENT DOCUMENTS

| | | |
|---|---|---|
| EP | 2 063 635 | 5/2009 |
| WO | 2007/122541 | 11/2007 |

OTHER PUBLICATIONS

Zhang Tong: Intelligent keyframe extraction for video printing:, Proceedings of SPIE, The International Society for Optical Engineering SPIE, USA, vol. 5601, Jan. 1, 2004, pp. 25-35, XP009093166, ISSN: 0277-786X, DOI: 10.1117/12.572474.

(Continued)

*Primary Examiner* — Aung S Moe
*Assistant Examiner* — MeKonnen Dagnew

(57) ABSTRACT

A digital video capture system for capturing a digital video sequence and for producing a corresponding video summary, comprising: an image sensor; an optical system; a processor, a softcopy display and a means for providing a user with an option to view either a stored digital video sequence or a video summary on the softcopy display. The processor performs the steps of: capturing a digital video sequence; automatically analyzing the digital video sequence at the time the digital video sequence is captured to determine one or more feature values; compressing the digital video sequence; storing the compressed digital video sequence; automatically analyzing the feature values to identify one or more key video snippets, assembling the key video snippets to form a video summary; and storing a representation of the video summary.

25 Claims, 5 Drawing Sheets

U.S. PATENT DOCUMENTS

| | | | |
|---|---|---|---|
| 7,409,144 B2 | 8/2008 | McGrath et al. | |
| 7,483,618 B1 | 1/2009 | Edwards et al. | |
| 7,542,077 B2 | 6/2009 | Miki | |
| 8,031,775 B2 * | 10/2011 | Luo et al. | 375/240.16 |
| 2003/0061612 A1 * | 3/2003 | Lee et al. | 725/61 |
| 2003/0081937 A1 * | 5/2003 | Li | 386/52 |
| 2004/0052505 A1 | 3/2004 | Ahmad et al. | |
| 2005/0041679 A1 * | 2/2005 | Weinstein et al. | 370/432 |
| 2005/0180730 A1 * | 8/2005 | Huh et al. | 386/52 |
| 2005/0191729 A1 | 9/2005 | Kaczmarek et al. | |
| 2006/0103736 A1 * | 5/2006 | Obrador | 348/222.1 |
| 2007/0182861 A1 | 8/2007 | Luo et al. | |
| 2007/0183497 A1 | 8/2007 | Luo et al. | |
| 2007/0226624 A1 * | 9/2007 | Peker et al. | 715/719 |
| 2007/0237225 A1 | 10/2007 | Luo et al. | |
| 2008/0043848 A1 | 2/2008 | Kuhn | |
| 2008/0155627 A1 * | 6/2008 | O'Connor et al. | 725/109 |
| 2008/0165863 A1 * | 7/2008 | Yan | 375/240.29 |
| 2009/0007202 A1 | 1/2009 | Williams et al. | |
| 2009/0103890 A1 * | 4/2009 | O'Connor et al. | 386/65 |
| 2010/0289959 A1 * | 11/2010 | Fonseca et al. | 348/564 |

OTHER PUBLICATIONS

Ma Y-F et al: "A Generic Framework of User Attention Model and its Application in Video summarization", IEE Transactions on Multimedia, IEEE Service Center, Piscataway, NJ, US, vol. 7, No. 5, Oct. 1, 2005, p. 907-919, XP01113970, ISSN: 1520-9210, DOI: 10.1109/TMM.2005,854410.

Ma Y-F et al: "A User Attention Model for Video Summarization", Proceedings 10$^{th}$ ACM International Conference on Mudltimedia. Juan-les-Pins, France, Dec. 1-6, 2002, vol. Conf. 10, Dec. 1, 2002, pp. 533-543, XP001175055; DOI: 10.1145/641007,641116, ISBN: 978-1-58113-620-3.

Divakaran A et al: "Video browsing system for personal video recorders" Proceedings of SPIE, The International Society for Optical Engineering SPIE, USA, vol. 4861, Jan. 1, 2002, pp. 22-25, XP009092815, ISSN: 0277-786X, DOI: 10.117/12.470201.

\* cited by examiner

VIDEO CAPTURE SYSTEM PRODUCING A VIDEO SUMMARY

CROSS-REFERENCE TO RELATED APPLICATIONS

Reference is made to commonly assigned, co-pending U.S. Patent Application Publication No. US2011/0293018, entitled: "Video Summary Method and System", by Aaron T. Deever; to commonly assigned, co-pending U.S. Patent Application Publication No. US2011/0292244, entitled: "Storing A Video Summary As Metadata", by Aaron T. Deever; to commonly assigned, co-pending U.S. Patent Application Publication No. US2011/0292288, entitled: "Method For Determining Key Video Frames", by Aaron T. Deever; to commonly assigned, co-pending U.S. Patent Application Publication No. US2011/0292229, entitled: "Ranking Key Video Frames Using Camera Fixation", by Aaron T. Deever; and to commonly assigned, co-pending U.S. Patent Application Publication No. US2011/0293250, entitled: "Determining Key Video Snippets Using Selection Criteria", by Aaron T. Deever, each of which are incorporated herein by reference.

FIELD OF THE INVENTION

This invention pertains to the field of digital video processing and more particularly to a method for forming digital video summary.

BACKGROUND OF THE INVENTION

Many digital capture devices are capable of capturing video as well as still images. Managing digital video content, however, can be a difficult task. Videos are often represented visually with a thumbnail image of the first frame of the video. This may not provide much insight into the content of the video. Determining if a specific event is contained in a given video often requires viewing the entire video. For a lengthy video, a user may prefer to be able to get a quick summary of the video without having to view the video in its entirety.

Digital videos can also present practical problems from a sharing perspective. Many digital capture devices record video at 30 or 60 frames per second, at spatial resolutions as high as 1920×1080 pixels. Even when compressed, the amount of data generated can make it impractical to share even relatively short videos.

Video editing software can be used to manually summarize a video into a shorter version that can be shared more easily. Manual video editing can be a lengthy, laborious process, however, and many users are not interested in manual editing. Automatic video summarization algorithms exist as well. These solutions start with a captured video as input, and analyze the video to determine a video summary. Such algorithms are very complex, however, as it is necessary to decode the video to perform the analysis required to determine the video summary. Thus it is not possible on a digital capture device to immediately view a video summary corresponding to a just-captured video. This shortcoming makes it difficult to facilitate quick review and sharing of captured videos.

It would thus be desirable to provide systems and methods for computing a video summary in a digital capture device. In particular, it would be desirable to provide solutions that allow a video summary to be generated on a digital capture device with minimal delay at the completion of video capture.

SUMMARY OF THE INVENTION

The present invention represents a digital video capture system for capturing a digital video sequence and for producing a corresponding video summary, comprising:

an image sensor for capturing a video frame;

an optical system for imaging a scene onto the image sensor;

a processor for performing the steps of:
 capturing a digital video sequence including a plurality of video frames;
 automatically analyzing at least one of the video frames in the digital video sequence at the time the digital video sequence is captured to determine one or more feature values;
 compressing the digital video sequence;
 storing the compressed digital video sequence in a processor-accessible memory;
 automatically analyzing the feature values, without decompressing the stored compressed digital video sequence, to identify one or more key video snippets, each key video snippet corresponding to a set of video frames from the digital video sequence;
 assembling the key video snippets to form a video summary; and
 storing a representation of the video summary in a processor-accessible memory;

a softcopy display for viewing a digital video sequence; and a means for providing a user with an option to view either the stored digital video sequence or the stored representation of the video summary on the softcopy display.

This invention has the advantage that it analyzes the video data at the time of capture to determine feature values thereby eliminating the need to decompress the video data at the time the video summary is created.

It has the additional advantage that it analyzes the feature values after the completion of capture, without the need to decompress the stored digital video sequence, to identify one or more key video snippets. The key video snippets are assembled to form a video summary. This allows a video summary to be generated and viewed on a digital capture device with minimal delay at the completion of video capture.

It has the further advantage that a user is enabled to conveniently choose between viewing the original digital video sequence or viewing the video summary.

In some embodiments, the video summary is encoded in a digital video file using metadata without needing to encode the video summary as a separate file. This has the advantage that the video summary is conveniently available for viewing with "smart" video players that understand the video summary metadata while being transparent to conventional players.

DETAILED DESCRIPTION OF THE INVENTION

Figure 1:
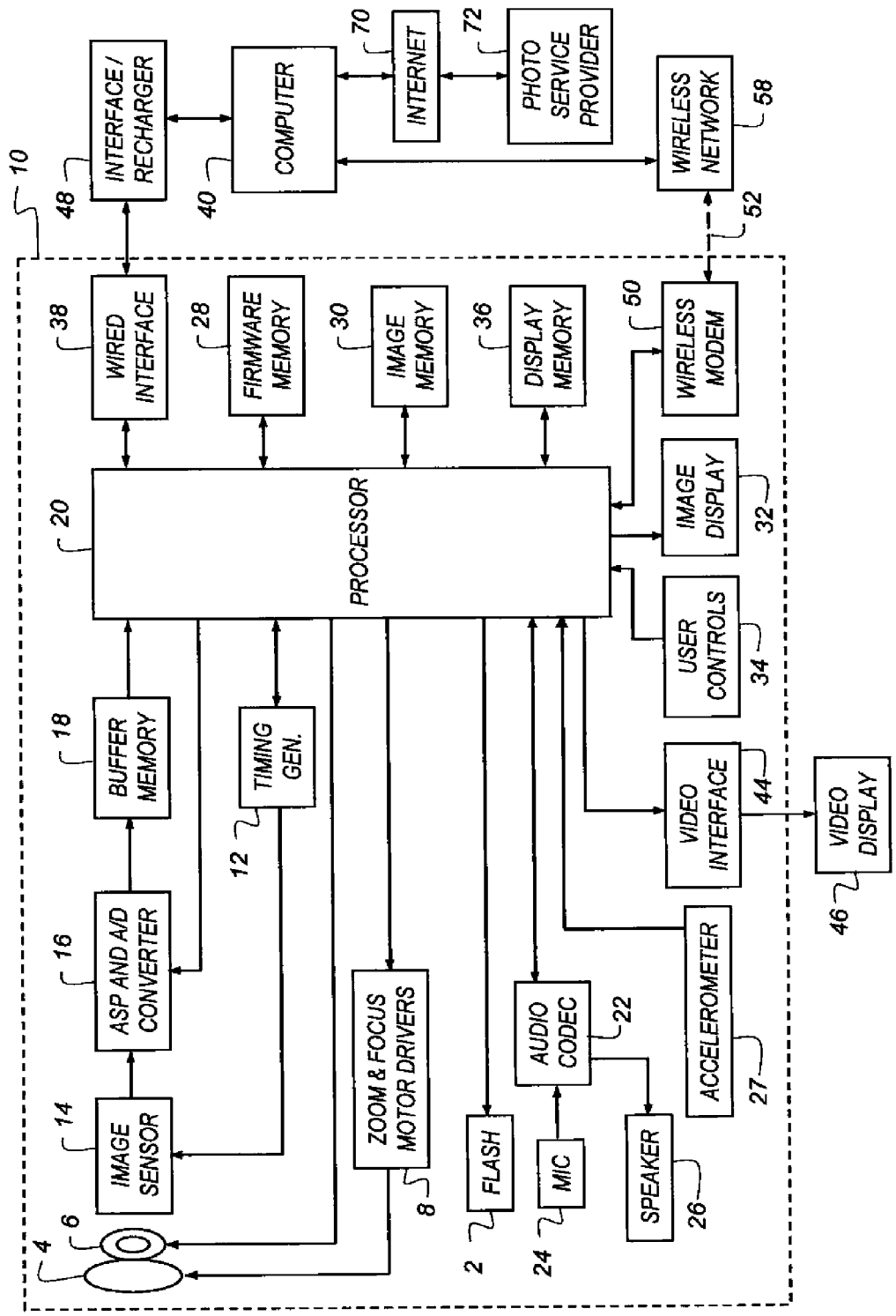
FIG. 1 is a high-level diagram showing the components of a system for forming a video summary according to an embodiment of the present invention.

In the following description, a preferred embodiment of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, a computer program for performing the method of the present invention can be stored in a computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program having instructions for controlling one or more computers to practice the method according to the present invention.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Because digital cameras employing imaging devices and related circuitry for signal capture and processing, and display are well known, the present description will be directed in particular to elements forming part of, or cooperating more directly with, the method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

The following description of a digital camera will be familiar to one skilled in the art. It will be obvious that there are many variations of this embodiment that are possible and are selected to reduce the cost, add features or improve the performance of the camera.

FIG. 1 depicts a block diagram of a digital photography system, including a digital camera 10 capable of capturing video images in accordance with the present invention. Preferably, the digital camera 10 is a portable battery operated device, small enough to be easily handheld by a user when capturing and reviewing images. The digital camera 10 produces digital images that are stored as digital image files using image memory 30. The phrase "digital image" or "digital image file", as used herein, refers to any digital image file, such as a digital still image or a digital video file.

In some embodiments, the digital camera 10 captures both motion video images and still images. In other embodiments, the digital camera 10 is a digital video camera that captures only motion video images. The digital camera 10 can also include other functions, including, but not limited to, the functions of a digital music player (e.g. an MP3 player), a mobile telephone, a GPS receiver, or a programmable digital assistant (PDA).

The digital camera 10 includes a lens 4 having an adjustable aperture and adjustable shutter 6. In a preferred embodiment, the lens 4 is a zoom lens and is controlled by zoom and focus motor drives 8. The lens 4 focuses light from a scene (not shown) onto an image sensor 14, for example, a single-chip color CCD or CMOS image sensor. The lens 4 is one type optical system for forming an image of the scene on the image sensor 14. In other embodiments, the optical system may use a fixed focal length lens with either variable or fixed focus.

The output of the image sensor 14 is converted to digital form by Analog Signal Processor (ASP) and Analog-to-Digital (A/D) converter 16, and temporarily stored in buffer memory 18. The image data stored in buffer memory 18 is subsequently manipulated by a processor 20, using embedded software programs (e.g. firmware) stored in firmware memory 28. In some embodiments, the software program is permanently stored in firmware memory 28 using a read only memory (ROM). In other embodiments, the firmware memory 28 can be modified by using, for example, Flash EPROM memory. In such embodiments, an external device can update the software programs stored in firmware memory 28 using the wired interface 38 or the wireless modem 50. In such embodiments, the firmware memory 28 can also be used to store image sensor calibration data, user setting selections and other data which must be preserved when the camera is turned off. In some embodiments, the processor 20 includes a program memory (not shown), and the software programs stored in the firmware memory 28 are copied into the program memory before being executed by the processor 20.

It will be understood that the functions of processor 20 can be provided using a single programmable processor or by using multiple programmable processors, including one or more digital signal processor (DSP) devices. Alternatively, the processor 20 can be provided by custom circuitry (e.g., by one or more custom integrated circuits (ICs) designed specifically for use in digital cameras), or by a combination of programmable processor(s) and custom circuits. It will be understood that connectors between the processor 20 from some or all of the various components shown in FIG. 1 can be made using a common data bus. For example, in some embodiments the connection between the processor 20, the buffer memory 18, the image memory 30, and the firmware memory 28 can be made using a common data bus.

The processed images are then stored using the image memory 30. It is understood that the image memory 30 can be any form of memory known to those skilled in the art including, but not limited to, a removable Flash memory card, internal Flash memory chips, magnetic memory, or optical memory. In some embodiments, the image memory 30 can include both internal Flash memory chips and a standard interface to a removable Flash memory card, such as a Secure Digital (SD) card. Alternatively, a different memory card format can be used, such as a micro SD card, Compact Flash (CF) card, MultiMedia Card (MMC), xD card or Memory Stick.

The image sensor 14 is controlled by a timing generator 12, which produces various clocking signals to select rows and pixels and synchronizes the operation of the ASP and A/D converter 16. The image sensor 14 can have, for example, 12.4 megapixels (4088×3040 pixels) in order to provide a still image file of approximately 4000×3000 pixels. To provide a color image, the image sensor is generally overlaid with a color filter array, which provides an image sensor having an array of pixels that include different colored pixels. The different color pixels can be arranged in many different patterns. As one example, the different color pixels can be arranged using the well-known Bayer color filter array, as described in commonly assigned U.S. Pat. No. 3,971,065, "Color imaging array" to Bayer, the disclosure of which is incorporated herein by reference. As a second example, the different color pixels can be arranged as described in commonly assigned U.S. Patent Application Publication 2005/191729, filed on Jul. 28, 2007 and titled "Image sensor with improved light sensitivity" to Compton and Hamilton, the disclosure of which is incorporated herein by reference. These examples are not limiting, and many other color patterns may be used.

It will be understood that the image sensor 14, timing generator 12, and ASP and A/D converter 16 can be separately fabricated integrated circuits, or they can be fabricated as a single integrated circuit as is commonly done with CMOS image sensors. In some embodiments, this single integrated circuit can perform some of the other functions shown in FIG. 1, including some of the functions provided by processor 20.

The image sensor 14 is effective when actuated in a first mode by timing generator 12 for providing a motion sequence of lower resolution sensor image data, which is used when capturing video images and also when previewing a still image to be captured, in order to compose the image. This preview mode sensor image data can be provided as HD resolution image data, for example, with 1280×720 pixels, or as VGA resolution image data, for example, with 640×480 pixels, or using other resolutions which have significantly fewer columns and rows of data, compared to the resolution of the image sensor.

The preview mode sensor image data can be provided by combining values of adjacent pixels having the same color, or by eliminating some of the pixels values, or by combining some color pixels values while eliminating other color pixel values. The preview mode image data can be processed as described in commonly assigned U.S. Pat. No. 6,292,218 to Parulski, et al., entitled "Electronic camera for initiating capture of still images while previewing motion images," which is incorporated herein by reference.

The image sensor 14 is also effective when actuated in a second mode by timing generator 12 for providing high resolution still image data. This final mode sensor image data is provided as high resolution output image data, which for scenes having a high illumination level includes all of the pixels of the image sensor, and can be, for example, a 12 megapixel final image data having 4000×3000 pixels. At lower illumination levels, the final sensor image data can be provided by "binning" some number of like-colored pixels on the image sensor, in order to increase the signal level and thus the "ISO speed" of the sensor.

The zoom and focus motor drivers 8 are controlled by control signals supplied by the processor 20, to provide the appropriate focal length setting and to focus the scene onto the image sensor 14. The exposure level of the image sensor 14 is controlled by controlling the f/number and exposure time of the adjustable aperture and adjustable shutter 6, the exposure period of the image sensor 14 via the timing generator 12, and the gain (i.e., ISO speed) setting of the ASP and A/D converter 16. The processor 20 also controls a flash 2 which can illuminate the scene.

The lens 4 of the digital camera 10 can be focused in the first mode by using "through-the-lens" autofocus, as described in commonly-assigned U.S. Pat. No. 5,668,597, entitled "Electronic Camera with Rapid Automatic Focus of an Image upon a Progressive Scan Image Sensor" to Parulski et al., which is incorporated herein by reference. This is accomplished by using the zoom and focus motor drivers 8 to adjust the focus position of the lens 4 to a number of positions ranging between a near focus position to an infinity focus position, while the processor 20 determines the closest focus position which provides a peak sharpness value for a central portion of the image captured by the image sensor 14. The focus distance which corresponds to the closest focus position can then be utilized for several purposes, such as automatically setting an appropriate scene mode, and can be stored as metadata in the image file, along with other lens and camera settings.

The processor 20 produces menus and low resolution color images that are temporarily stored in display memory 36 and are displayed on the image display 32. The image display 32 is typically an active matrix color liquid crystal display (LCD), although other types of displays, such as organic light emitting diode (OLED) displays, can be used. A video interface 44 provides a video output signal from the digital camera 10 to a video display 46, such as a flat panel HDTV display. In preview mode, or video mode, the digital image data from buffer memory 18 is manipulated by processor 20 to form a series of motion preview images that are displayed, typically as color images, on the image display 32. In review mode, the images displayed on the image display 32 are produced using the image data from the digital image files stored in image memory 30.

The graphical user interface displayed on the image display 32 is controlled in response to user input provided by user controls 34. The user controls 34 are used to select various camera modes, such as video capture mode, still capture mode, and review mode, and to initiate capture of still images and recording of motion images. In some embodiments, the first mode described above (i.e. still preview mode) is initiated when the user partially depresses a shutter button, which is one of the user controls 34, and the second mode (i.e., still image capture mode) is initiated when the user fully depresses the shutter button. The user controls 34 are also used to turn on the camera, control the lens 4, and initiate the picture taking process. User controls 34 typically include some combination of buttons, rocker switches, joysticks, or rotary dials. In some embodiments, some of the user controls 34 are provided by using a touch screen overlay on the image display 32. In other embodiments, additional status displays or images displays can be used.

The camera modes that can be selected using the user controls 34 include a "timer" mode. When the "timer" mode is selected, a short delay (e.g., 10 seconds) occurs after the user fully presses the shutter button, before the processor 20 initiates the capture of a still image.

An audio codec 22 connected to the processor 20 receives an audio signal from a microphone 24 and provides an audio signal to a speaker 26. These components can be to record and playback an audio track, along with a video sequence or still image. If the digital camera 10 is a multi-function device such as a combination camera and mobile phone, the microphone 24 and the speaker 26 can be used for telephone conversation.

In some embodiments, the speaker 26 can be used as part of the user interface, for example to provide various audible signals which indicate that a user control has been depressed, or that a particular mode has been selected. In some embodiments, the microphone 24, the audio codec 22, and the processor 20 can be used to provide voice recognition, so that the user can provide a user input to the processor 20 by using voice commands, rather than user controls 34. The speaker 26 can also be used to inform the user of an incoming phone call. This can be done using a standard ring tone stored in firmware memory 28, or by using a custom ring-tone downloaded from a wireless network 58 and stored in the image memory 30. In addition, a vibration device (not shown) can be used to provide a silent (e.g., non audible) notification of an incoming phone call.

In some embodiments, the digital camera 10 also contains an accelerometer 27 which provides data related to the motion of the camera. Preferably, the accelerometer 27 detects both linear and rotational accelerations for each of three orthogonal directions (for a total of 6 dimensions of input).

The processor 20 also provides additional processing of the image data from the image sensor 14, in order to produce rendered sRGB image data which is compressed and stored within a "finished" image file, such as a well-known Exif-JPEG image file, in the image memory 30.

The digital camera 10 can be connected via the wired interface 38 to an interface/recharger 48, which is connected to a computer 40, which can be a desktop computer or portable computer located in a home or office. The wired interface 38 can conform to, for example, the well-known USB 2.0 interface specification. The interface/recharger 48 can provide power via the wired interface 38 to a set of rechargeable batteries (not shown) in the digital camera 10.

The digital camera 10 can include a wireless modem 50, which interfaces over a radio frequency band 52 with the wireless network 58. The wireless modem 50 can use various wireless interface protocols, such as the well-known Bluetooth wireless interface or the well-known 802.11 wireless interface. The computer 40 can upload images via the Internet 70 to a photo service provider 72, such as the Kodak EasyShare Gallery. Other devices (not shown) can access the images stored by the photo service provider 72.

In alternative embodiments, the wireless modem 50 communicates over a radio frequency (e.g. wireless) link with a mobile phone network (not shown), such as a 3GSM network, which connects with the Internet 70 in order to upload digital image files from the digital camera 10. These digital image files can be provided to the computer 40 or the photo service provider 72.

The present invention will now be described with reference to FIG. 2. Initially, a digital video capture device such as digital camera 10 is used in a capture digital video sequence step 210 to capture a digital video sequence, wherein the digital video sequence is comprised of a plurality of video frames.

At the time that the digital video sequence is captured, at least a subset of the video frames is analyzed in a determine feature values step 220 to determine one or more feature values. These feature values can represent various attributes associated with a video frame, such as color characteristics or the presence of any faces in the video frame. The feature values can also represent motion-based attributes such as global motion values between consecutive video frames, or local motion values between corresponding elements of consecutive frames. Global motion values typically correspond to motion of the capture device, while local motion values refer to the movement of objects within the scene. Those skilled in the art will recognize that the previously described features are only examples, and that other feature values can be determined based on analysis of video frames.

The determine feature values step 220 can also include analysis of at least one audio sample as they are recorded through the microphone 24 and processed with the audio codec 22 at the time the digital video sequence is captured. Audio feature values can include attributes such as the signal strength, both in the time domain as well as with respect to particular frequency ranges.

The determine feature values step 220 can also include analysis of digital video capture device settings at the time the digital video sequence is captured. These device setting feature values can include user input in the form of a user control 34 to adjust the zoom position of zoom lens 4 by controlling the zoom and focus motor drives 8. Digital zoom can further increase the magnification of an image and can be another feature value.

The determine feature values step 220 can also include analysis of accelerometer data from accelerometer 27 at the time the digital video sequence is captured. Accelerometer data provides measurements related to the motion of the digital camera 10, and can be used to augment or replace motion calculations based on video frame data.

The determine feature values step 220 can also include analysis of data generated by the video encoder applied by the processor 20. Such data includes motion vector information generated as part of a motion estimation step used in the video encoding process. Many common video encoding processes routinely generate such motion vector information as part of their normal processing chain.

For each video frame, after the feature values have been determined, a compress digital video sequence step 230 compresses the video frame. Video compression algorithms such as specified in the MPEG and H.263 standards are well-known to those skilled in the art. The compressed video frame can be included in a container such as Apple QuickTime which provides a file format wrapper for the video file.

A store compressed digital video sequence step 240 stores the compressed digital video sequence in a processor-accessible memory, such as image memory 30. The stored compressed digital video sequence can contain video and audio information.

In one embodiment of the present invention, the feature values determined in the determine feature values step 220 are stored as metadata associated with the stored compressed digital video sequence. The metadata can be stored, for example, within user data atoms that are defined in the specifications for the Apple QuickTime file format.

In another embodiment of the present invention, the feature values determined in the determine feature values step 220 are stored as a separate file associated with the stored compressed digital video sequence.

In yet another embodiment of the present invention, the feature values determined in the determine feature values step 220 are not stored in any form of permanent memory, and are discarded at the completion of the video summary formation algorithm.

After the video capture process has completed and the compressed digital video sequence has been stored, an identify key video snippets step 250 is performed to identify key video snippets for the digital video sequence. The identify key video snippets step 250 uses a processor to automatically analyze the feature values, without needing to decompress the stored compressed digital video sequence, to identify one or more key video snippets, each key video snippet corresponding to a set of video frames from the digital video sequence. Typically the video frames comprising a key video snippet are consecutive frames in the digital video sequence, and the key video snippet can be identified by a starting frame number, and either an ending frame number or a value indicating the length of the key video snippet.

Many methods are known in the art for determining key video snippets from a video based on feature values associated with the video. In some of these approaches, video key frames are first identified, and then key video snippets are formed by selecting a section of the video sequence surrounding each of the video key frames. U.S. Patent Application Publication 2007/0183497, by Luo et al., which is incorporated herein by reference, discloses a method of selecting video key frames based on a characterization of the motion in the video, as calculated by digital motion estimation techniques. U.S. Patent Application Publication 2007/0182861, by Luo et al., also included herein by reference, discloses a method of selecting video key frames based on a characterization of the motion in the video, as provided by data from an accelerometer associated with the video capture device. Either of these methods can be used to identify key video snippets from the determined feature values in accordance with the present invention.

For embodiments where the feature values are stored as a separate file associated with the stored compressed digital video sequence, the identify key video snippets step 250 can read the feature values from the separate file to provide the feature value information for analysis.

Similarly, for embodiments where the feature values are stored as metadata associated with the stored compressed digital video sequence, the identify key video snippets step 250 can extract the feature values from the stored compressed digital video sequence without decompressing video frames for the stored digital video sequence. It should be noted that extracting feature value metadata from a stored compressed digital video sequence is not considered to be decompressing the stored compressed digital video sequence. Rather, decompressing the stored compressed digital video sequence refers to decoding of data in the compressed bitstream, such as video data or header data used to reconstruct a sequence of video frames for the compressed digital video sequence.

An advantage of the present invention is that it allows key video snippets to be determined without decompressing the stored compressed digital video sequence. This allows the key video snippets to be determined, and subsequently the video summary to be formed, with minimal delay after the capture process has completed. Methods in the prior art that rely on decompression to extract individual video frames from the stored compressed digital video sequence are bounded by the amount of time required to perform the decompression task.

In some embodiments of the present invention, the key video snippets are identified entirely based on analysis of feature values determined at the capture time of the digital video sequence. In other embodiments of the present invention, the key video snippets are identified based on analysis of feature values along with additional information extracted from the stored compressed digital video sequence. In these cases, it may be necessary to at least partially decompress some information in the stored compressed digital video sequence.

For example, in one embodiment of the present invention, audio information is extracted from the stored compressed digital video sequence, and used along with the feature values to identify the key video snippets. Audio data typically comprises a small percentage of an overall compressed digital video file, and can be extracted quickly relative to decompressing the pixel data for the video frames. In some scenarios, it is not possible to generate audio feature values at the time of capture. The processor may not have compute cycles available to determine audio feature values and also determine other feature values and process and encode the captured video. In these cases, audio information can still be used to identify key video snippets by extracting the audio information from the stored compressed digital video sequence. This represents a compromise between speed and performance. The audio information can be used to improve the performance of the identify key video snippets step 250, at a cost of longer overall processing time required to identify the key video snippets.

Similarly, in another embodiment of the present invention, video frame information is extracted from the stored compressed digital video sequence, and used along with the feature values to identify the key video snippets. Decompression of the entire video sequence eliminates much of the advantage of determining video-based feature values at the time of capture. Thus, preferably, at most only a small number of video frames are decoded from the stored compressed digital video sequence. Those skilled in the art will recognize that individual frames can be decoded from a compressed digital video sequence efficiently when the individual frame is an independently coded frame. Again, the use of video information represents a compromise between speed and performance. The video information can be used to improve the performance of the identify key video snippets step 250, at a cost of longer overall processing time required to identify the key video snippets.

In some embodiments of the present invention, the identify key video snippets step 250 utilizes user input from user controls 34 to control various attributes of the video summary. The user input can include, but is not limited to specifying a length of the video summary, a minimum duration of an individual key video snippet, and a total number of key video snippets.

In a preferred embodiment, the identify key video snippets step 250 uses the method described in commonly assigned, co-pending U.S. patent application Ser. No. 12/786,471 to Deever, entitled "Method For Determining Key Video Frames," which is incorporated herein by reference. This method first analyzes the digital video sequence to determine an importance value as a function of time. The importance value can be a function of characteristics of the digital video sequence including global motion and local motion. Preferably, the importance value is computed using the feature values determined from the determine feature values step 220. The importance value is used to form a warped-time representation for the digital video sequence. The warped-time representation gives greater temporal weighting to some video frames in the digital video sequence and lesser temporal weighting to others. The warped-time digital video sequence representation is divided into a set of equal warped temporal intervals. A key video frame is selected from each warped temporal interval by analyzing the video frames within each warped temporal interval. Preferably, the key video frame for each warped temporal interval is selected by analyzing feature values determined from the determine feature values step 220 associated with video frames in the corresponding warped temporal interval. Such criteria can include selecting a key video frame occurring shortly after the completion of a zoom-in process, or selecting a key video frame having a moderate level of local motion in the center region of the video frame.

In one embodiment, key video snippets are formed by selecting a set of video frames surrounding each of the key video frames. For example, a key video snippet can be formed by selecting two seconds of video frames before and after a key video frame, thus forming a four second long key video snippet.

Alternatively, the key video frames can be ranked and key video snippets can be formed for only a subset of the key video frames corresponding to the most highly ranked key video frames. Ranking of key video frames can include analyzing the digital video sequence to determine a camera fixation pattern, and ranking the key video frames responsive to the camera fixation pattern. Preferably, feature values determined from the determine feature values step 220 corresponding to global motion can provide a global motion trace that indicates the fixation region of the camera throughout the digital video sequence. Video frames corresponding to regions of high fixation, that is, regions on which the camera stayed fixated for a high percentage of the overall video capture, are ranked highly. The ranking process can be performed iteratively, selecting the next highest ranking key video frame at each step, and at each step the process can promote key video frames representing unrepresented fixation regions above key video frames representing fixation regions that have already been included in the ranking process. Once the key video frames have been ranked, the top ranking key video frames can be chosen to be included in key video snippets.

As described previously, key video snippets can be formed by selecting a set of video frames surrounding each of the key video frames. Alternatively, key video snippets can be formed by setting criteria such as the total duration of the video summary, and the minimum allowable duration of a key video snippet. Then the key video snippets can be selected so as to satisfy the set criteria while being optimally responsive to additional criteria. For example, the key video snippets can be selected so as to minimize the likelihood that a key video snippet begins or ends in the middle of a speaking segment.

After the key video snippets have been identified, a form video summary step 260 forms the video summary. The video summary is formed by assembling the individual key video snippets into a single collection. In a preferred embodiment, the key video snippets are assembled in chronological order corresponding to their order of occurrence in the digital video sequence.

A representation of the video summary is stored in a processor-accessible memory in store representation of video summary step 270. In one embodiment of the present invention, storing a representation of the video summary in a processor-accessible memory includes storing frame identification metadata providing an indication of the video frames in the digital video sequence corresponding to the video summary. The frame identification metadata can be stored in association with the stored compressed digital video sequence. For example, the video summary representation can be stored as metadata in the stored compressed digital video sequence that indicates a series of start frames and end frames that correspond to the key video snippets contained in the video summary. This allows a representation of the video summary to be stored without using any additional physical memory, other than that required to store the frame identification metadata.

In another embodiment of the present invention, storing a representation of the video summary in a processor-accessible memory includes extracting video frames of the stored compressed digital video sequence corresponding to the identified key video snippets and merging them to form a new merged video sequence corresponding to the video summary. In some cases, this may require decompressing portions of the compressed digital video sequence and then compressing the merged video sequence to form a compressed video summary. The merged video sequence will generally include both video data and corresponding audio data, which must also be extracted from the compressed digital video sequence.

The compressed video summary can then be stored in a processor-accessible memory. In this embodiment, the compressed video summary is stored as a separate file from the compressed digital video sequence. In this case, the video summary representation is a digital video file that can be viewed or shared independent of the original compressed digital video sequence. In a preferred embodiment, the stored representation of the video summary is a digital video file in a format adapted to be played using a standard video player.

In some embodiments of the present invention, extracted video frames corresponding to the video summary are re-sampled to produced extracted video frames at a different spatial resolution prior to compressing the extracted video frames at a different spatial resolution to form a compressed video summary. This re-sampling can be especially advantageous for sharing videos that are captured at high spatial resolution. In this way, the compressed video summary will be smaller than the compressed digital video sequence both because it contains fewer video frames, as well as because the video frames have a lower spatial resolution. The lower spatial resolution video summary can be generated without having to decompress the entire collection of higher resolution video frames. Only those video frames required for generating the video summary need to be decompressed.

Similarly, extracted video frames corresponding to the video summary can be re-sampled in the temporal dimension to produce extracted video frames at a different temporal resolution prior to compressing the extracted video frames at a different temporal resolution to form a compressed video summary.

Figure 2:
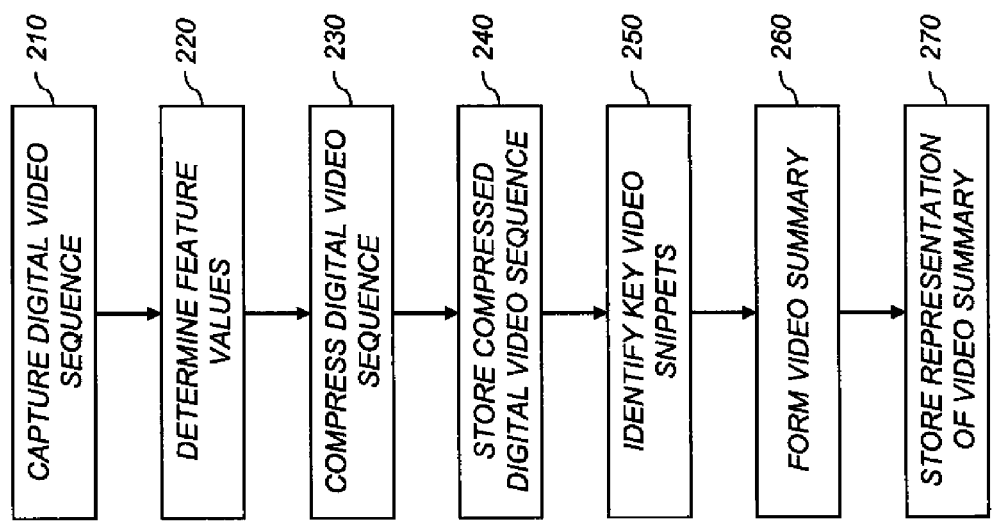
FIG. 2 is a flow diagram of a method for creating video summaries according to an embodiment of the present invention.
Figure 3:
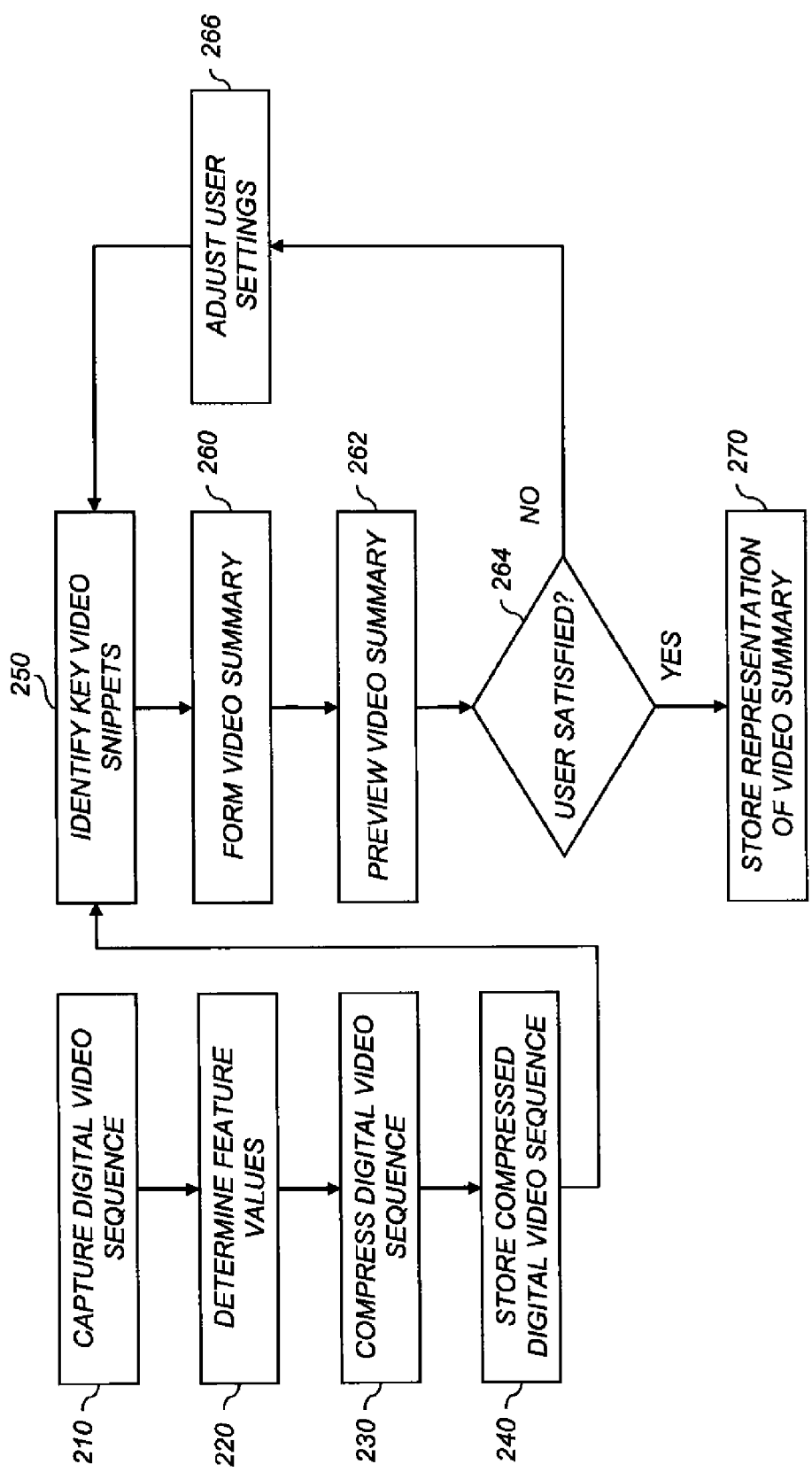
FIG. 3 is a flow diagram of a method for creating video summaries utilizing user feedback according to an embodiment of the present invention.

FIG. 3 corresponds to another embodiment of the present invention in which the user previews the formed video summary and can request that an updated video summary be formed using adjusted user settings. In this embodiment, the capture digital video sequence step 210, the determine feature values step 220, the compress digital video sequence step 230, the store compressed digital video sequence step 240, the identify key video snippets step 250, the form video summary step 260 and the store representation of video summary step 270 are all performed as described previously with reference to FIG. 2. Before the video summary formed by the form video summary step 260 is stored, the user is allowed to preview the video summary using a preview video summary step 262. The user is them prompted to indicate his or her satisfaction with the first video summary using a user satisfied test 264. If the user is satisfied with the video summary, execution proceeds to the store representation of video summary step 270 as described with reference to FIG. 2. However, if the user is not satisfied with the video summary, an adjust user settings step 266 is used to allow the user to adjust one or more settings and then form a new video summary. These users' settings can be input through user controls 34, and can include settings for parameters such as the length of the video summary, the minimum length of key video snippets or the number of key video snippets included in the video summary. After the user has adjusted the user settings, the identify key video snippets step 250 and the form video summary step 260 are used to form a new video summary responsive to the user settings. Those skilled in the art will recognize that the user can preview the video summary and update the user settings multiple times, forming corresponding video summaries until the user is satisfied with the resulting video summary.

Figure 4:
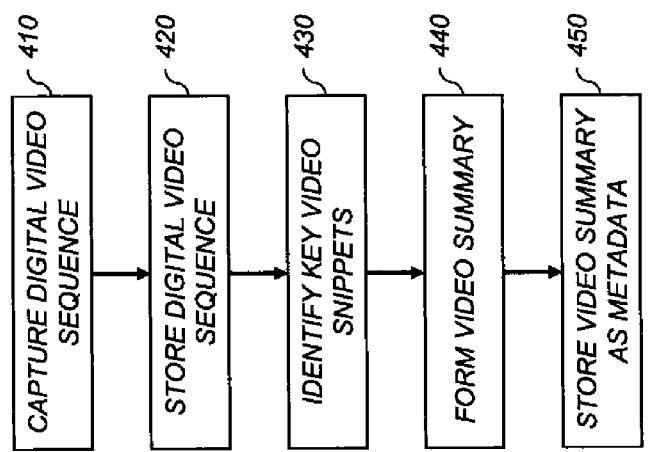
FIG. 4 is a flow diagram of a method for creating video summaries according to an embodiment of the present invention where the video summary is stored as metadata.

FIG. 4 illustrates another embodiment of the present invention in which a video summary is stored as metadata associated with a stored digital video sequence. A capture digital video sequence step 410 captures a digital video sequence with a digital video capture device, wherein the digital video sequence includes a plurality of video frames. A store digital video sequence step 420 stores the digital video sequence in a processor-accessible memory. The stored digital video sequence may or may not include determined feature values as were determined using the determine feature values step 220 of FIG. 2.

Next, an identify key video snippets step 430 identifies one or more key video snippets corresponding to one or more sets of video frames from the stored digital video sequence. In some embodiments, the identify key video snippets step 430 can make use of stored feature values as was described with reference to the identify key video snippets step 250 of FIG. 2. In other embodiments, the identify key video snippets step 430 uses a video analysis algorithm to directly analyze the frames of the stored digital video sequence. In this case, the identify key video snippets step 430 will generally need to decompress the digital video sequence in order to perform its analysis. Any method known in the art can be used to identify the key video snippets, including those described earlier with reference to FIG. 2.

A form video summary step 440 assembles the identified key video snippets to form a video summary in a manner analogous to the form video summary step 260 of FIG. 2. A store video summary as metadata step 450 stores the video summary in a processor-accessible memory by storing metadata associated with the stored digital video sequence, wherein the metadata provides an indication of the video frames corresponding to the video summary.

The identify key video snippets step 430, the form video summary step 440 and the store video summary as metadata step 450 need not occur on the 1.5 same digital video capture device or using the same processor 20 as the capture digital video sequence step 410 and the store digital video sequence step 420. For example, the store digital video sequence step 420 can result in the stored digital video sequence being written to image memory 30, which can be for example, a removable memory card. The removable memory card can then be used to move the stored digital video sequence to another device where the identify key video snippets step 430, the form video summary step 440 and the store video summary as metadata step 450 can be applied. In some cases, the other device can be another digital video capture device, such as illustrated in FIG. 1. In other embodiments, the stored digital video sequence is loaded onto another device such as a computer 40 (FIG. 1) or a video editing system where the stored digital video sequence can be processed to determine the video summary.

In a preferred embodiment, the identify key video snippets step 430 involves extracting at least one video frame from the stored digital video sequence, and analyzing said video frames to determine feature values associated with the video frames. In a preferred embodiment, the identify key video snippets step 430 further involves extracting at least one audio sample from the stored digital video sequence, and analyzing said audio samples to determine feature values associated with the audio samples. The feature values can be analyzed to identify the key video snippets.

In a preferred embodiment, the store video summary as metadata step 450 includes storing frame identification metadata providing an indication of the video frames in the digital video sequence corresponding to the video summary. Storing the video summary in this manner as frame identification metadata has the advantage that the video summary to be stored without using any additional physical memory, other than the minimal amount of memory required to store the frame identification. Preferably, the frame identification metadata is stored in association with the stored compressed digital video sequence. For example, the video summary representation can be stored as metadata in the stored compressed digital video sequence that indicates a series of start frames and end frames that correspond to the key video snippets contained in the video summary. In other embodiments the frame identification metadata can be stored in a separate file associated with the stored digital video sequence.

In some embodiments of the present invention, the store video summary as metadata step 450 further includes storing metadata that provides an indication of the audio samples corresponding to the key video snippets which comprise the video summary.

In some embodiments of the present invention, the store video summary as metadata step 450 further includes storing metadata providing an indication of video transition effects to be applied at boundaries between the identified key video snippets. Video transition effects can include, for example, fading from one key video snippet to the next (i.e., "cross dissolving"), and fading from a key video snippet to white (or black) and then fading to the next video snippet. Other types of transition effects would include special effects such as cross wipe effects, growing or shrinking circle effects, horizontal or vertical blinds effects, and checkerboard transition effects. One skilled in the art will recognize that these are just a few examples, and that many different types of transition effects can be used in accordance with the present invention. Using video transition effects can improve the overall visual quality of the video summary by eliminating sudden transitions from one segment of the digital video sequence to another.

In some embodiments of the present invention, the store video summary as metadata step 450 further includes storing metadata providing an indication of audio transition effects applied at boundaries between key video snippets. Audio transition effects can include, for example, fading to silence and back. These audio transition effects can improve the overall audio quality of the video summary by eliminating sudden transitions from one audio segment of the digital video sequence to another.

Figure 5:
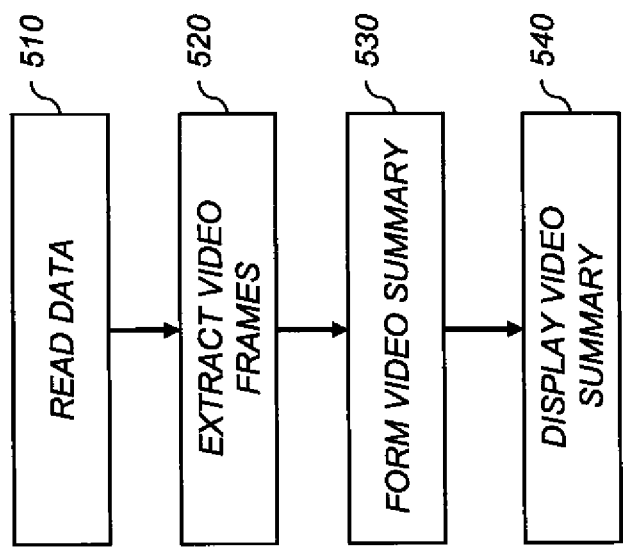
FIG. 5 is a flow diagram of a method for viewing video summaries according to an embodiment of the present invention.

FIG. 5 illustrates a flow chart of a process for use by a video playback system for displaying a video summary in accordance with the present invention. In particular, the method of FIG. 5 is adapted to display video summaries which are stored as metadata rather than as a directly playable digital video file.

First, a read data step 510 reads data associated with a stored digital video summary, wherein the data provides an indication of the video frames of a stored digital video sequence corresponding to the video summary. For example, the data providing an indication of the video frames can be extracted from metadata stored in a digital video file used to store a digital video sequence, wherein the metadata indicates which video frames are included in the video summary. Alternately, the data can also be extracted from a separate file that is associated with the stored digital video sequence.

Next, an extract video frames step 520 extracts the video frames corresponding to the key video snippets which comprise the video summary from the stored digital video sequence. Commonly, the stored digital video sequence is stored in a compressed form. In such cases, the extract video frames step 520 includes decompressing the stored digital video sequence.

A form video summary step 530 is used to form a video summary from the extracted video frames for the key video snippets. In the simplest case, the form video summary step 530 simply compiles the extracted video frames into a contiguous video clip.

Once the video summary has been formed, a display video summary step 540 is used to display the video summary on a softcopy display. The softcopy display can, for example, be a review screen on a digital video capture device, a display associated with a computer or a television screen.

The read data step 510 can also provide an indication of the audio samples corresponding to the video summary. In this case, the extract video frames step 520 can further include extracting the appropriate audio samples from the stored digital video sequence corresponding to the video summary.

In some embodiments of the present invention, the read data step 510 further provides an indication of video transition effects for the video summary. Similarly, the read data step 510 can provide an indication of audio transition effects for the video summary. In the case that the read data step 510 provides an indication of video transition effects, the form video summary step 530 modifies the extracted video frames in accordance with the specified transition effects such that the compiled video summary has the desired transitions. Thus, for example, a fade-to-black video transition effect can be applied by reading data that indicates that the fade occurs during the last 15 frames of a key video snippet contained in the video summary. As the frames corresponding to the fade-to-black video transition are extracted from the stored digital video sequence, the video frame data can be modified according to a formula for gradual fade-to-black. The fade-to-black can be reversed during the first 15 frames of the next key video snippet, during which the extracted frames are modified according to a formula for gradual fade from black back to the original video data.

In the case that the softcopy display also contains one or more speakers for transmitting audio, audio transition effects can similarly be processed prior to transmission of the audio via the speakers. For example, a fade-to-silence audio transition effect can be applied by reading data that indicates the audio transition effect occurs during the final 8000 audio samples corresponding to a key video snippet. As the audio samples corresponding to the fade-to-silence transition are extracted from the stored digital video sequence, the audio sample data can be modified according to a formula for gradual fade-to-silence. The fade-to-silence can be reversed during the first 8000 audio samples corresponding to the next key video snippet, during which the extracted audio samples are modified according to a formula for gradual fade from silence back to the original audio data.

In some methods for forming a video summary according to the present invention, video summary metadata corresponding to the video frames or audio samples contained in the video summary, as well as video or audio transition effects, are stored in the digital video file containing the stored digital video sequence. Also, in some systems for displaying a video summary according to the present invention, this video summary metadata is read to provide an indication of which video frames and audio samples corresponding to the video summary need to be extracted from the stored digital video sequence, and together with an indication of what video and audio transition effects should be applied to the data prior to displaying the video on the display and transmitting the audio to the speakers. These methods and systems have the advantage that a video summary can be represented and displayed without storing an additional separate video file corresponding to the video summary.

In some embodiments, a video display device can present a user with the option to view either the original video or the video summary. For example, separate play buttons can be provided on a digital video camcorder for playing the original video sequence or the video summary. In some embodiments, the video summary can be played in response to activating a "fast forward" button. This reflects the fact that the video summary represents an alternative way to move through a video sequence at an accelerated pace rather than the traditional fast forward approach which simply provides a time sampling of the frames in the video sequence. Playing the video summary can be a more useful means for users to identify a desired portion of a video sequence that they would like to view.

The video playback system described with reference to FIG. 5 is a "smart" video player in the sense that it is enabled to extract video summary metadata from the stored digital video sequence, and process the video summary metadata to understand how to display a video summary version of the digital video sequence. The "smart" video player can present the viewer the option of viewing either the full digital video sequence or the video summary version. A regular video player will not recognize the video summary metadata associated with the video summary. However, a regular video player can still read and display the original stored digital video sequence. In this case, the metadata contained in the stored digital video sequence is simply ignored, and the full digital video sequence is played.

Again referring to FIG. 1 and FIG. 2, another embodiment of the present invention is a digital video capture system (digital camera 10) for capturing a digital video sequence and for producing a corresponding video summary, comprising: an image sensor 14 for capturing a video frame; an optical system (lens 4 having an adjustable aperture and adjustable shutter 6) for imaging a scene onto the image sensor; a processor 20 for forming the video summary and storing a representation of the video summary in a processor-accessible memory; an image display 32 for viewing a digital video sequence; and a means, such as user controls 34, for providing a user with an option to view either the stored digital video sequence or the stored representation of the video summary on the softcopy display. The digital video capture system can, for example, be a digital video camera or a digital camera having both still and video capture modes. The digital video capture system can also take other forms such as a laptop or desktop computer having a webcam.

The processor 20 in the digital video capture system is provided with software to perform the steps of the method shown in FIG. 2. More specifically, in response to a user command, the processor 20 can initiate the capture digital video sequence step 210 which captures a digital video sequence including a plurality of video frames. The processor 20 automatically analyzes at least a subset of the video frames in the digital video sequence at the time the digital video sequence is captured to determine one or more feature values using a determine feature values step 220. The processor 20 then compresses the digital video sequence by applying the compress digital video sequence step 230; and the resulting compressed digital video sequence is stored in a processor-accessible memory by applying the store compressed digital video sequence step 240. The processor 20 then applies the identify key video snippets step 250 to automatically analyze the feature values, without decompressing the stored compressed digital video sequence, thereby identifying one or more key video snippets, each key video snippet corresponding to a set of video frames from the digital video sequence. Finally, the processor 20 applies the form video summary step 260 to assemble the key video snippets to form a video summary, and stores a representation of the video summary in a processor-accessible memory using the store representation of video summary step 270.

The processor 20 in the digital video capture system can further perform the step of automatically analyzing at least one of the audio samples in the digital video sequence at the time the digital video sequence is captured to determine one or more feature values.

The processor 20 in the digital video capture system can further perform the step of storing the determined feature values in the processor-accessible memory as metadata associated with the stored compressed digital video sequence.

The processor 20 in the digital video capture system can further perform the step of storing the determined feature values in the processor-accessible memory as a separate file associated with the stored compressed digital video sequence.

The processor 20 in the digital video capture system can further perform the step of automatically analyzing the features values, together with user input, to identify the one or more key video snippets. The user input can come from user controls 34, and can include constraints on the length of the video summary, the minimum length of any key video snippet contained in the video summary, and the number of key video snippets included in the video summary.

The processor 20 in the digital video capture system can further perform the step of storing a representation of the video summary in a processor-accessible memory in which metadata providing an indication of the video frames in the digital video sequence corresponding to the video summary is generated and stored in association with the stored compressed digital video sequence.

A user can activate a user control 34 on the digital video capture system to view the video summary on the softcopy image display 32, or on an external video display 46. In the case that the video summary is stored as metadata providing an indication of the video frames in the digital video sequence corresponding to the video summary, the video summary can be extracted and displayed as described in FIG. 5. In particular, the digital video capture system can also perform the role of a "smart" video player and can extract appropriate video and audio data based on the metadata.

In some embodiments, a user interface can be provided to enable a user to review the video summary and decide whether or not it is acceptable. If the user determines that the video summary is not desirable, the digital video capture system can provide a means, through user controls 34, to present the user with an option to request a video summary with user adjusted user settings. These adjusted user settings can include, for example, the length of the video summary, the minimum length of a key video snippet in the video summary, or the number of key video snippets to be included in the video summary. In some embodiments, the system can automatically form a series of video summary options using different settings or different variations of the identify key video snippets step 250. Thus a user can effectively be enabled to choose between multiple video summary versions, thereby decreasing the likelihood that no satisfactory video summary is produced, and increasing the overall success of the feature.

This described digital video capture system provides the advantage that a series of video summaries can be generated and reviewed quickly, without having to decompress the stored compressed digital video sequence, and without having to encode the video summary as a new file.

Storing the video summary using a separate video summary file is desirable in the case that the video summary is to be shared across a network or with any device not equipped with a "smart" video display that can interpret the metadata contained in the compressed digital video sequence and thereby extract the video summary. In this case, the stored representation of the digital video summary generated by the processor 20 of the digital video capture system can be a digital video file stored in a format adapted to be played using a standard video player. In some embodiments, the video summary is always stored as a separate video summary file. Alternately, a user control 34 can be provided to allow the user to select the preferred method for storing the video summary. In some embodiments, the video summary can be stored as a separate video summary file in response to a user initiating a "share" button on the user interface.

In embodiments where the digital video capture system stores the video summary as a separate file, the processor 20 can further perform the step of storing a representation of the video summary as a digital video file in a processor-accessible memory. In this case, the processor 20 is provided with software to decompress at least the portion of the stored compressed digital video sequence corresponding to the video summary, and then compress the extracted video frames to form a compressed video summary, which can be stored in a processor-accessible memory. Further, the processor 20 in the digital video capture system can perform the step of decompressing at least part of the stored compressed digital video sequence to extract audio samples corresponding to the video summary, compressing the extracted audio samples and including the compressed extracted audio samples in the compressed video summary.

Sharing of video files across computer networks is also facilitated by lowering the spatial or temporal resolution or the original video sequence prior to sharing. The processor 20 in the digital video capture system can further re-sample the extracted video frames to produce extracted video frames at a different spatial or temporal resolution. The present invention is advantageous in that it allows a lower resolution video summary file to be formed without decompressing the entire original compressed digital video sequence. Only the compressed digital video data relevant to generating the video summary need be decompressed. This allows faster transcoding from the original compressed digital video sequence to the video summary.

Sharing of video files across networks is also facilitated by increasing the aggressiveness of the compression used to decrease the size of the compressed digital video sequence. The processor 20 in the digital video capture system can further compress the extracted video frames at a more aggressive compression setting than the stored compressed digital video sequence to produce a highly compressed video summary. The present invention is advantageous in that it allows a more highly compressed video summary file to be formed without decompressing the entire original compressed digital video sequence.

The image sensor 14, optical system (lens 4), processor 20 and softcopy display (image display 32) of the digital video capture system can all be components of a digital video camera, and a user interface control on the digital video camera can be user to provide the user with the option to view either the stored compressed digital video sequence or the stored video summary on the softcopy display of the digital video camera. In this framework, a user can capture a video on a digital video camera, immediately view a summary version of the video, request modifications if desired, then choose to share the video summary, whereby a separate video summary file can be generated and shared.

The digital video camera can also be connected to an external softcopy display, such that the user can view either the stored compressed digital video sequence or the stored video summary on the external softcopy display.

The softcopy display can also be a component of an independent video viewing system capable of accessing the stored digital video sequence and the stored video summary, and the user interface control on the digital camera can provide the user the option to view either the stored compressed digital video sequence or the stored video summary on the softcopy display.

The processor 20 of the digital video capture system can further provide video transition effects that are applied between the key video snippets when forming the video summary. The results of the video transition effects can be computed at the time of display. This is particularly advantageous for a video summary stored as metadata associated with a stored compressed digital video sequence.

In some embodiments of the present invention, the processor 20 of the digital video capture system automatically selects video transition effects from a plurality of available transition effects by analyzing the key video snippets. Fade-to-white transitions are preferable with some video content, while fade-to-black can be preferable with other video content, and additional different video transitions can be preferred for additional other video content. Automatic analysis of the key video snippets can provide information indicating which video transition effect provides the best visual result between two key video snippets.

Audio transition effects can be handled in a similar fashion. The processor 20 of the digital video capture system can further include audio transition effects that are applied between the key video snippets when forming the video summary. The results of the audio transition effects can be computed at the time of display.

In another embodiment of a digital video capture system according to the present invention, the processor 20 applies a variation of the identify key video snippets step 250 which involves automatically analyzing the feature values, along with information contained in the stored compressed digital video sequence, to identify the key video snippets. In this embodiment, speed is sacrificed in exchange for additional information available when determining key video snippets comprising the video summary. In many cases, the processor 20 may not have compute cycles available to compute all the desired feature values at capture time. In this case, the stored compressed digital video sequence can be partially decompressed to extract information to be used in the calculation of key video snippets. For example, audio information contained in the stored compressed digital video sequence can be extracted in some embodiments of the present invention. Additionally, video information contained in the stored compressed digital video sequence can also be extracted in some embodiments of the present invention.

Another feature enabled by the present invention is an assisted manual trim feature. Many digital video capture devices offer an editing feature of manual trim, wherein a user may review a captured video, and elect to trim from the beginning and end of the video. Using the present invention, a video summary comprising a single key video snippet can be formed, and the beginning and end points of the video summary are provided as suggested manual trim points.

Note that the process of determining feature values at capture time and using the determined feature values after capture can be useful for other applications in addition to forming a video summary. Other options, including using the feature values to determine key frames in a video are considered within the scope of this invention.

Many digital video sequence compression algorithms use groups of pictures when encoding the video. A group of pictures includes an independently coded video frame, together with additional video frame which rely on information from at least one other video frame in order to be decoded. One popular instantiation of a group of pictures is to have an independently encoded frame (an 'I' frame) followed by a sequence of predictive encoded frames ('P' frames) in which each 'P' frame is predicted from the previous frame. The group of pictures ends and a new group of pictures begins with the next 'I' frame. In such a compression scheme, 'I' frame offer access points into the compressed digital video sequence, wherein frames can be extracted starting at an 'I' frame. In particular, entire groups of pictures can be extracted from a compressed digital video sequence and transcoded into a video summary only requiring decoding of header information indicating the location of and number of compressed bytes comprising the group of pictures. Thus it can be advantageous when forming a video summary to impose a constraint that the starting frame of each key video snippet is an 'I' frame beginning a group of pictures, and preferably the key video snippet contains an exact number of groups of pictures. This constraint allows the generation of a separate video summary file with minimal decompression of the original compressed digital video sequence.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST

2 flash
4 lens
6 adjustable aperture and adjustable shutter
8 zoom and focus motor drives
10 digital camera
12 timing generator
14 image sensor
16 ASP and A/D Converter
18 buffer memory
20 processor
22 audio codec
24 microphone
25 pressure sensor
26 speaker 27 accelerometer
28 firmware memory
30 image memory
32 image display
34 user controls
36 display memory
38 wired interface
40 computer
42 tilt sensor
44 video interface
46 video display
48 interface/recharger
50 wireless modem
52 radio frequency band
58 wireless network
70 Internet
72 photo service provider
210 capture digital video sequence step
220 determine feature values step
230 compress digital video sequence step
240 store compressed digital video sequence step
250 identify key video snippets step
260 form video summary step
262 preview video summary step
264 user satisfied test
266 adjust user settings step
270 store representation of video summary step
410 capture digital video sequence step
420 store compressed digital video sequence step
430 identify key video snippets step
440 form video summary step
450 store video summary as metadata step
510 read data step
520 extract video frames step
530 form video summary step
540 display video summary step

The invention claimed is:

1. A digital video capture system for capturing a digital video sequence and for producing a corresponding video summary, comprising: an image sensor for capturing a video frame; an optical system for imaging a scene onto the image sensor;
   a digital camera that captures a digital video sequence including a plurality of video frames;
   a processor that automatically analyzes at least one of the video frames in the digital video sequence at the time the digital video sequence is captured to determine one or more feature values;
   the processor compresses the digital video sequence, wherein the analyzed video frames are compressed only after the corresponding feature values have been determined;
   stores the compressed digital video sequence in a processor-accessible memory;
   the stored compressed digital video sequence automatically gets analyzed for the feature values, without decompressing the stored compressed digital video sequence, to identify one or more key video snippets, each key video snippet corresponding to a set of video frames from the digital video sequence;
   assembles the key video snippets to form a video summary;
   and stores a representation of the video summary in a processor-accessible memory;
   a softcopy display to view a digital video sequence; and
   provides a user with an option to view either the stored digital video sequence or the stored representation of the video summary on the softcopy display.

2. The system of claim 1 wherein the digital video capture system automatically analyzes at least one of the audio samples in the digital video sequence at the time the digital video sequence is captured to determine one or more feature values.

3. The system of claim 1 wherein the determined feature values are stored in the processor-accessible memory as metadata associated with the stored compressed digital video sequence.

4. The system of claim 1 wherein the determined feature values are stored in the processor-accessible memory as a separate file associated with the stored compressed digital video sequence.

5. The system of claim 1 wherein the processor automatically analyzes the feature values and user input, without decompressing the stored compressed digital video sequence, identifies one or more key video snippets, each key video snippet corresponding to a set of video frames from the digital video sequence.

6. The system of claim 1 wherein the processor further stores a representation of the video summary in a processor-accessible memory at least part of the stored compressed digital video sequence to extract video frames to the video summary, and compresses the extracted video frames to form a compressed video summary, and the compressed video summary in a processor-accessible memory.

7. The system of claim 6 wherein the processor further decompresses at least part of the stored compressed digital video sequence to extract audio samples that corresponds to the video summary, compresses the extracted audio samples and includes the compressed extracted audio samples in the compressed video summary.

8. The system of claim 6 wherein the extracted video frames are re-sampled to produce extracted video frames at a different spatial resolution.

9. The system of claim 6 wherein the extracted video frames are compressed at a more aggressive compression setting than the stored compressed digital video sequence.

10. The system of claim 1 wherein the stored representation of the video summary is a digital video file stored in a format adapted to be played using a standard video player.

11. The system of claim 1 wherein the processor further stores a representation of the video summary in a processor-accessible memory and includes metadata providing an indication of the video frames in the digital video sequence that corresponds to the video summary, and wherein the metadata is stored in association with the stored compressed digital video sequence.

12. The digital video capture system of claim 1 wherein the image sensor, the optical system, the processor and the softcopy display are all components of a digital video camera, and wherein a user interface control on the digital video camera is used to provide the user with the option to view either the stored compressed digital video sequence or the stored video summary on the softcopy display of the digital video camera.

13. The digital video capture system of claim 1 wherein the image sensor, the optical system, the processor and the softcopy display are all components of a digital video camera which can be connected to an external softcopy display, and wherein a user interface control on the digital video camera is used to provide the user with the option to view either the stored compressed digital video sequence or the stored video summary on the external softcopy display.

14. The digital video capture system of claim 1 wherein the image sensor, the optical system, the processor and the softcopy display are all components of a digital video camera, and wherein the softcopy display is a component of an independent video viewing system capable of accessing the stored digital video sequence and the stored video summary, and wherein a user interface control on the digital video camera is used to provide the user with the option to view either the stored compressed digital video sequence or the stored video summary on the softcopy display.

15. The system of claim 1 further provides a user with an option to request a video summary according to user settings.

16. The system of claim 15 wherein the user settings include the length of the video summary.

17. The system of claim 15 wherein the user settings include the minimum length of a key video snippet in the video summary.

18. The system of claim 1 wherein the assembled video summary includes video transition effects that are applied between the key video snippets.

19. The system of claim 18 wherein the results of the video transition effects are computed at the time of display.

20. The system of claim 18 wherein the video transition effects are automatically selected from a plurality of available transition effects by analyzing the key video snippets.

21. The system of claim 1 wherein the assembled video summary includes audio transition effects that are applied between the key video snippets.

22. The system of claim 21 wherein the results of the audio transition effects are computed at the time of display.

23. A digital video capture system for capturing a digital video sequence and for producing a corresponding video summary, comprising: an image sensor for capturing a video frame; an optical system for imaging a scene onto the image sensor;
- a digital camera that captures a digital video sequence including a plurality of video frames; automatically analyzes at least one of the video frames in the digital video sequence at the time the digital video sequence is captured to determine one or more feature values; the digital video sequence, wherein the analyzed video frames are compressed only after the corresponding feature values have been determined;
- stores the compressed digital video sequence in a processor-accessible memory; after the compressed digital video sequence automatically analyzes the feature values, along with information contained in the stored compressed digital video sequence, to identify one or more key video snippets, each key video snippet corresponding to a set of video frames from the digital video sequence; assembling the key video snippets to form a video summary; and storing a representation of the video summary in a processor-accessible memory; a softcopy display to view a video sequence; and provides a user with an option to view either the stored compressed digital video sequence or the stored representation of the video summary on the softcopy display;
- a means for providing a user with an option to view either the stored compressed digital video sequence or the stored representation of the video summary on the softcopy display.

24. The system of claim 23 wherein a processor is used to automatically analyze the feature values along with audio information contained in the stored compressed digital video sequence, to identify one or more key video snippets, each key video snippet corresponding to a set of video frames from the digital video sequence.

25. The system of claim 23 wherein a processor is used to automatically analyzes the feature values along with video information contained in the stored compressed digital video sequence, to identify one or more key video snippets, each key video snippet corresponding to a set of video frames from the digital video sequence.

* * * * *

UNITED STATES PATENT AND TRADEMARK OFFICE
CERTIFICATE OF CORRECTION

PATENT NO. : 8,446,490 B2  Page 1 of 1
APPLICATION NO. : 12/786501
DATED : May 21, 2013
INVENTOR(S) : Deever It is certified that error appears in the above-identified patent and that said Letters Patent is hereby corrected as shown below:

On the Title Page, Item (56), under "OTHER PUBLICATIONS", in Column 2, Line 1, delete "video printing:," and insert -- video printing, --, therefor.

On Title Page 2, Item (56), under "OTHER PUBLICATIONS", in Column 2, Line 1, delete "MaY-F et al:" and insert -- MaY-F et al., --, therefor.

On Title Page 2, Item (56), under "OTHER PUBLICATIONS", in Column 2, Line 6, delete "MaY-F et al:" and insert -- MaY-F et al., --, therefor.

On Title Page 2, Item (56), under "OTHER PUBLICATIONS", in Column 2, Line 7, delete "Mudltimedia." and insert -- Multimedia. --, therefor.

On Title Page 2, Item (56), under "OTHER PUBLICATIONS", in Column 2, Line 11, delete "Divakaran A et al:" and insert -- Divakaran A et al., --, therefor.

In the Specification

In Column 13, Line 47, delete "the 1.5 same" and insert -- the same --, therefor.

Signed and Sealed this
Eleventh Day of March, 2014

Michelle K. Lee
*Deputy Director of the United States Patent and Trademark Office*